US007161485B2

(12) United States Patent
Melman

(10) Patent No.: US 7,161,485 B2
(45) Date of Patent: Jan. 9, 2007

(54) EMERGENCY VEHICLE TRANSMITTER AND RECEIVER ALERT SYSTEM

(76) Inventor: Emanuel Melman, 1616 McDonald Ave., Brooklyn, NY (US) 11230

( * ) Notice: Subject to any disclaimer, the term of this patent is extended or adjusted under 35 U.S.C. 154(b) by 0 days.

(21) Appl. No.: 10/677,503

(22) Filed: Oct. 2, 2003

(65) Prior Publication Data

US 2005/0073432 A1 Apr. 7, 2005

(51) Int. Cl.
*G08B 1/08* (2006.01)
*H04Q 7/00* (2006.01)

(52) U.S. Cl. ................................ 340/539.18; 340/902

(58) Field of Classification Search ........... 340/539.18, 340/901, 902, 903, 904, 905
See application file for complete search history.

(56) References Cited

U.S. PATENT DOCUMENTS

| | | | | |
|---|---|---|---|---|
| 4,618,948 A | * | 10/1986 | Sakakibara et al. | 367/104 |
| 4,864,297 A | * | 9/1989 | Shaw et al. | 340/902 |
| 4,887,086 A | * | 12/1989 | Unser et al. | 342/20 |
| 5,307,060 A | | 4/1994 | Prevulsky et al. | |
| 5,495,243 A | | 2/1996 | McKenna | |
| 5,889,475 A | | 3/1999 | Klosinski et al. | |
| 6,087,961 A | | 7/2000 | Markow | |
| 6,252,521 B1 | | 6/2001 | Griffen et al. | |
| 6,404,351 B1 | | 6/2002 | Beinke | |
| 6,529,831 B1 | | 3/2003 | Smith et al. | |

* cited by examiner

*Primary Examiner*—John Tweel, Jr.
(74) *Attorney, Agent, or Firm*—Jennifer Meredith, Esq.; Meredith & Keyhani, PLLC

(57) ABSTRACT

The present invention provides an apparatus which provides a system for alerting drivers of oncoming emergency vehicles. The system is comprised of a transmitter and receiver, both including a microcontroller and non-volatile memory component, connected to a logic interface used to facilitate connections between the microcontroller and external signals. The transmitter and receiver are both powered by power regulation and filtering means connected to the respective device. The transmitter further includes radio frequency (RF) generating means and an antenna system. An external trigger mechanism is also connected to the transmitter to activate the system. The receiver simply has a network of RF receiving means, which acts as a trigger to the system.

23 Claims, 4 Drawing Sheets

EMERGENCY VEHICLE TRANSMITTER AND RECEIVER ALERT SYSTEM

BACKGROUND OF THE INVENTION

The present invention relates to a device for notifying vehicles of the presence of an approaching emergency vehicle (i.e. police, fire or ambulance). This could prove to be quite beneficial in both clearing traffic for emergency vehicles to respond to true emergencies more quickly, while simultaneously reducing the number of accidents caused by emergency vehicles.

As the trend towards increasingly developed urban areas grows exponentially, the streets become more and more congested and crowded, with an ever increasing number of vehicles. Additionally, buildings increasing in size, height and proximity to the street make for an increasingly hazardous situation on the roads due to diminishing visibility. This leaves motorists with short notice on potential hazards, and fewer options regarding where to maneuver their vehicle to avoid such obstacles. For non-emergency vehicles this poses little more than an inconvenience, easily remedied by lowering their rate of speed, increasing travel time and keeping in tight control of their vehicle.

Emergency vehicles, however, are subject to a drastically different operating procedure. The impending urgency present in their travels creates a slight difficulty in ensuring both a safe and efficient response. It has become increasingly difficult to safely and quickly navigate through the increasingly full traffic patterns throughout the congested urban and suburban areas. The higher rate of speed at which these vehicles commonly travel normally arises from the need for immediate care or assistance, which poses an additional risk to themselves and those they are assisting.

Common methods of warning motorists of an approaching emergency vehicle are visual and audible warning devices. These include sirens, flashing lights in a variety of bright patterns. Naturally, most states have laws requiring motorists to pull over, allowing emergency vehicles t he right of way, while reducing the chance of a collision. These lights and siren warning systems have served somewhat sufficient limitations imposed by increasingly crowded streets and crowded building structures have diminished the effect of these systems. Often by the time that a driver realizes that an emergency vehicle is nearing there is neither time nor space for the driver to maneuver out of the way of the approaching emergency vehicle.

This forces drivers of these vehicles to slow down, thus increasing their response time, which at times may be a matter of life or death for an accident or emergency victim, desperately in need of professional assistance. Additionally the risk of a high speed collision is imminent in many cases, where high speed collisions should be something emergency vehicles are responding to rather than being involved it. Known within the art are systems which provide alerts to oncoming emergency vehicles, however none provide the ability to change the radio energy pattern of the transmitted signal relative to the speed of the emergency vehicle.

In U.S. Pat. No. 5,307,060, issued to Prevulsky, a device which uses a similar system using both a transmitter and receiver system, allowing all vehicles to be given sufficient warning of the approaching vehicle and its type. This is generally another useful piece of information as drivers would need to ensure pulling entirely off the road in clearing a path for a fire department vehicle or large ambulance, however the path for a police vehicle would not necessarily need to be so large.

Alternate disclosures include U.S. Pat. No. 6,529,831, issued to Smith, which teaches the use of a system including a navigation system placed within each vehicle interfaced with a transceiver-receiver system. This system, while useful in a multitude of purposes beyond the intent of warning drivers of imminent emergency vehicles, may prove to be too expensive and bulky to integrate into all vehicles. Thus working against the purpose of such a system, the effectiveness of such a system would hinge on the ability to inexpensively and sleekly incorporate a transmitter into all vehicles on the road. Additionally navigational systems are often susceptible to other problems such as decreased reception in metropolitan areas where tall buildings and other man-made obstacles can shadow reception.

Beinke, in U.S. Pat. No. 6,404,351, teaches a system which not only notifies vehicles of impending emergency vehicles, but also has the ability to change traffic lights in a further effort to clear the roadways for emergency traffic. This may prove to be dangerous, as the connection to the traffic light may open a backdoor for hackers to gain access to such a system, which could cause accidents. Again this may prove to add an additional cost in producing the system, which will hinder the quick implementation into all vehicles. An alternate device, as disclosed in U.S. Pat. No. 5,889,475, issued to Klosinski, transmits across a broadband of AM and FM frequencies to warn vehicles through existing radio devices. While this is advantageous due to the lack of necessity to add additional parts to vehicles it is impossible to assume the AM or FM transmission will reach all vehicles, for example those who do not listen to the radio, and prefer a compact disc player or no background noise in their automobile.

The current subject of invention uses a microcontroller paired with a non-volatile memory which makes the design compact and lightweight, thus making it easy to implement such a system into many vehicles quite quickly. Additionally the ability to change the radio energy pattern of the transmitted signal relative to the speed of the emergency vehicle minimizes the unnecessary notification of vehicles who are not within the path of the oncoming emergency vehicle.

SUMMARY OF THE INVENTION

The present invention provides systems and methods for notifying drivers of emergency vehicles. Such apparatus are useful for notifying drivers of oncoming emergency vehicles, as well as providing a clear path for emergency vehicles.

The present invention, in a preferred embodiment, provides a system for notifying drivers of emergency vehicles. The system comprises a transmitter having a microcontroller, a non-volatile memory, and a logic interface for sending and receiving external signals. Additionally it includes a RF generating means, a radio antenna system and switching means, a power regulation and filtering means and an external trigger, all in electrical communication with the transceiver. The system also includes a receiver having a microcontroller, a non-volatile memory and a logic interface for sending and receiving external signals. Additionally including a RF receiving means and a power regulation and filtering means in electrical communication with the receiver.

According to an alternate embodiment of the present invention, a system for notifying drivers of emergency vehicles, the system comprises a transmitter having a microcontroller which dictates a change in the radio energy pattern of transmitted data from omni-directional at speeds under thirty MPH to unidirectional at speeds above thirty MPH, a non-volatile memory storing a unique serial number and vehicle type code, and a logic interface for sending and receiving external signals which determines the speed of the vehicle. Additionally including an RF generating means, a radio antenna system and switching means, a power regulation and filtering means which supplies between three and seven volts to said logic system and between negative fifteen and fifteen volts to said RF generating means and an external trigger which causes the microcontroller to activate the RF generating means and send data for modulation and transmission, all in electrical communication with the transmitter. The system also comprises a receiver having a microcontroller, a non-volatile memory storing a unique serial number and vehicle type code and a logic interface for sending and receiving external signals connected to a warning device wherein the device varies relative to the speed of the approaching emergency vehicle. Additionally including an RF receiving means and a power regulation and filtering means in electrical communication with said receiver which supplies between three and seven volts to the logic system and between negative fifteen and fifteen volts to the RF generating means.

Yet another preferred embodiment pertains to a method of manufacturing a system for notifying drivers of emergency vehicles comprising the steps of providing a transmitter having a microcontroller, a non-volatile memory and a logic interface, attaching a RF generating means to the transceiver, attaching a radio antenna system and switching means to the transceiver. Further steps include attaching power regulation and filtering means to the transceiver, attaching an external trigger to the transceiver, providing a receiver having a microcontroller, a non-volatile memory and a logic interface, attaching a RF receiving means to the receiver and attaching a power regulation and filtering means to the receiver.

This summary is not to be taken in a limiting sense, but is made merely for the purpose of illustrating the general principles of the invention, since the scope of the invention is best defined by the appended claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
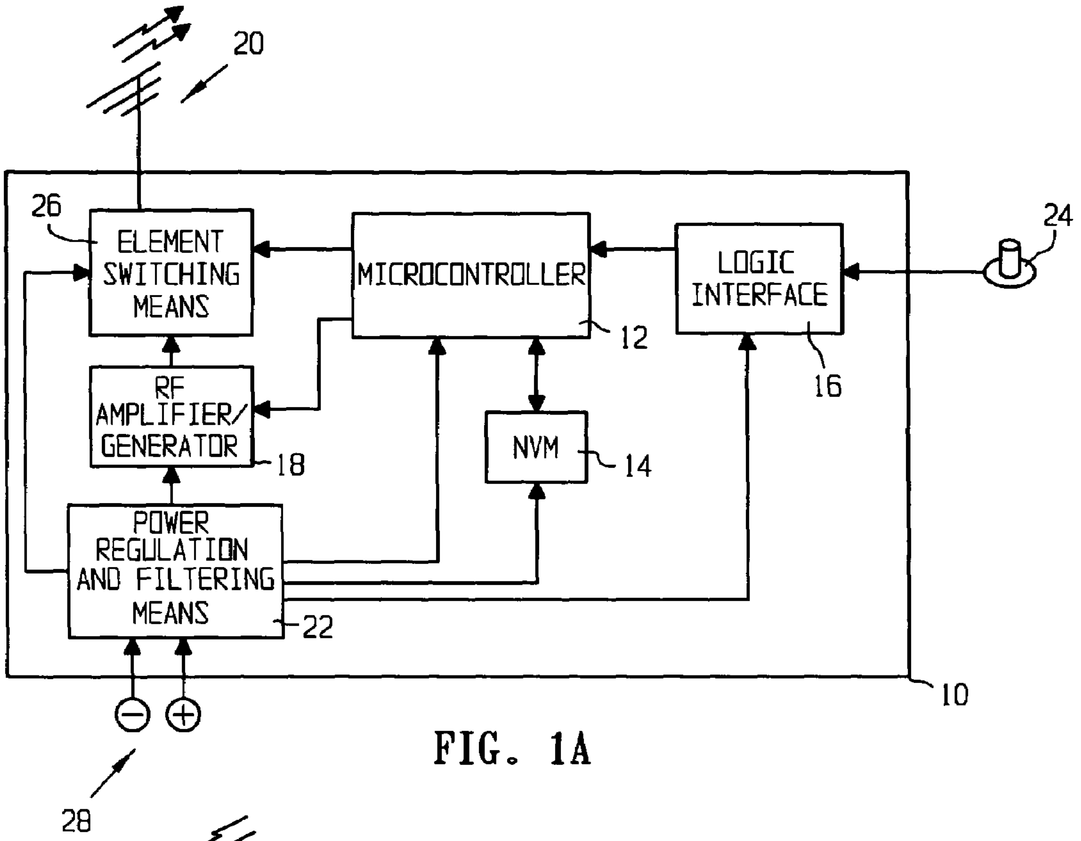
FIGS. 1A, 1B, 1C and 1D depict a system for notifying drivers of oncoming emergency vehicles according to the present invention.
Figure 1B:
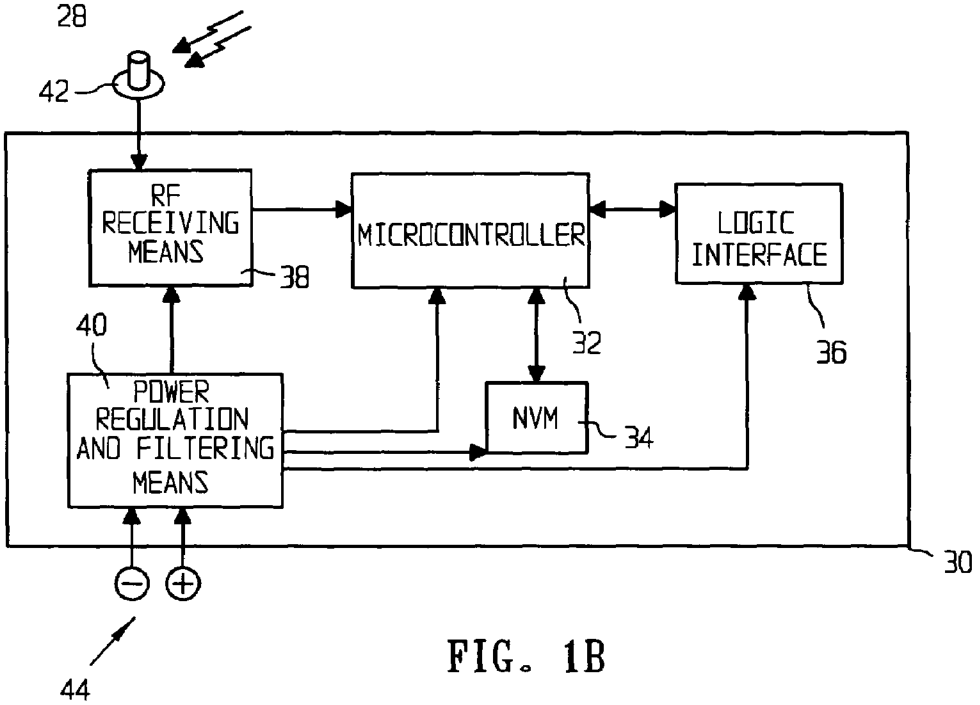

FIGS. 1A and 1B depict a system for notifying drivers of emergency vehicles, where the term driver refers to the operator of a vehicle or any other means of transportation. The system intended to be onboard an emergency vehicle, such as an ambulance or a police or fire vehicle, comprises a transmitter 10, as shown in FIG. 1A, having a microcontroller 12, a non-volatile memory 14 and a logic interface 16 for sending and receiving external signals. The system also includes a radio frequency (RF) generating means, as depicted by the RF amplifier/generator 18, a radio antenna system and switching means as depicted by the antenna 20 and element switching means 26 and a power regulation and filtering means 22 are also in electrical communication with the transmitter 10. The power regulation and filtering means 22 is connected to a power supply 28 which in a preferred embodiment may be an internal or external power supply or battery. An external trigger 24 is connected to the transmitter 10 and triggering this device will cause microcontroller 12 to activate RF generating means, as depicted by the RF amplifier/generator 18, and send data for modulation and transmission. The second major part of the system, as shown in FIG. 1B, is the receiver 30, having a microcontroller 32, a non-volatile memory 34, and a logic interface 36 for sending and receiving external signals. This device is not limited to solely civilian vehicles as an emergency vehicle would also be interested in the presence of another oncoming emergency vehicle. This receiver also includes a RF receiving means 38, and a power regulation and filtering means 40 also in electrical communication with the receiver 30. The power regulation and filtering means 40 is connected to an internal or external power supply 42. In an alternate embodiment this receiver may be connected to an on-board computer system.

Figure 1C:
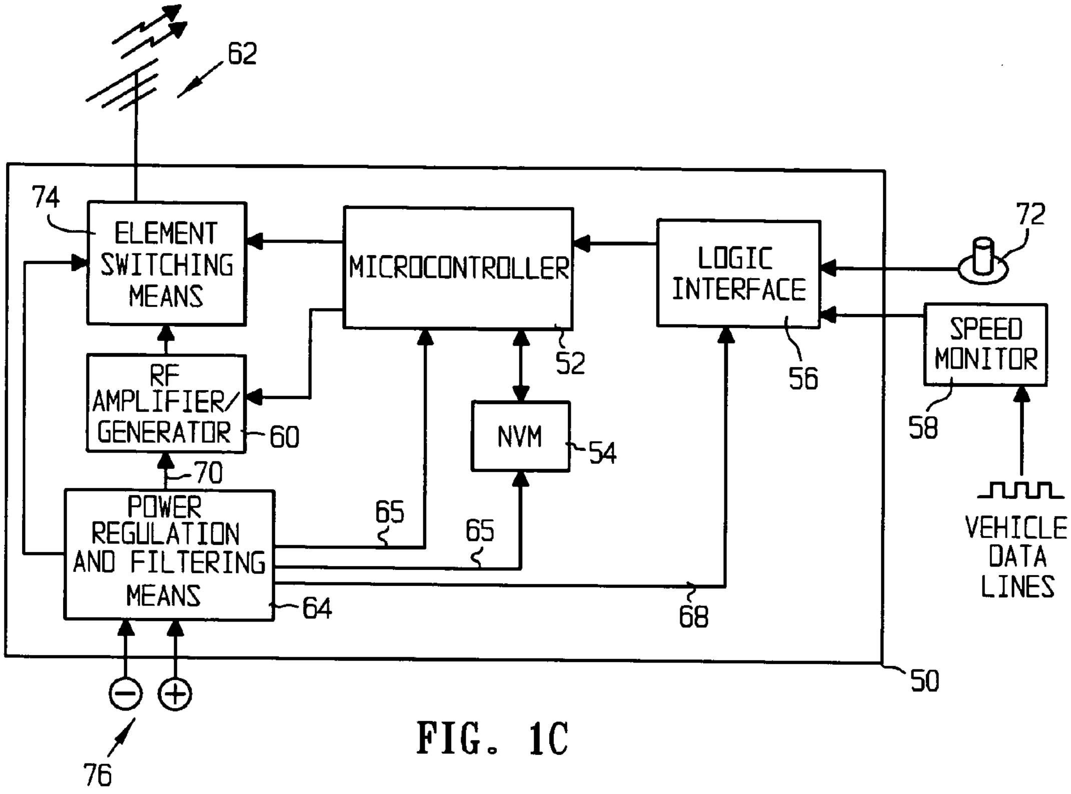
Figure 1D:
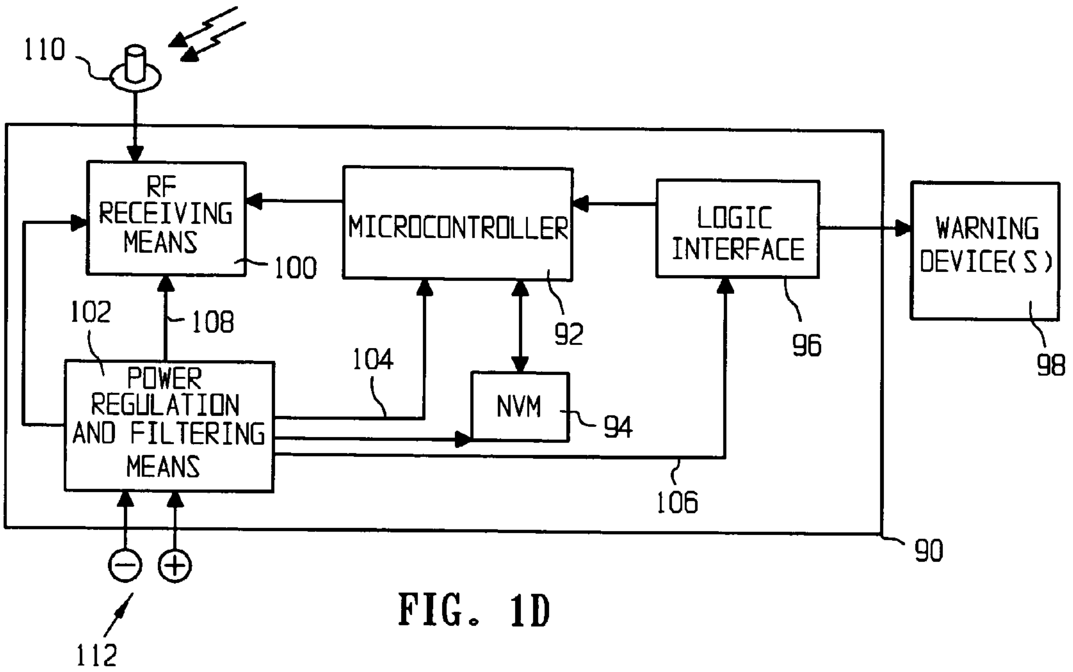

A preferred embodiment may store a vehicle type code and unique serial number in the non-volatile memory 14 of the transmitter 10 and non-volatile memory 34 of the receiver 30. This vehicle type code is selected from the following group consisting of police vehicles, fire department vehicles, emergency medical units, passenger vehicles, motorcycles, sport utility vehicles, trucks, mopeds or commercial vehicles. Alternatively as depicted in FIG. 1C the transmitter 50 logic interface 56 determines the speed of the emergency vehicle using a speed monitor 58. In response to input from the speed monitor 58, the microcontroller 52 provides a command to the RF generating means, as depicted by the RF amplifier/generator 60, to output the transmitted data in an omni-directional pattern at speeds under thirty miles per hour from the antenna 62. When the speed is determined to be greater than thirty miles per hour (MPH), another command is provided to the RF generating means, as depicted by the RF amplifier/generator 60, to output the transmitted data in a unidirectional pattern from the antenna 62. Yet another embodiment may provide between three and seven volts, ideally approximately five volts to the logic interface 56 of the transmitter 50 as shown by connection 68 to the power regulation and filtering means 64. The power and filtering means 64 also supplies between negative fifteen and fifteen volts, ideally approximately twelve volts to the RF generating means, as depicted by the RF amplifier/generator 60, by means of connection 70. As shown in FIG. 1D, the power and filtering means 102 within the receiver 90 provides between negative fifteen and fifteen volts, ideally approximately twelve volts to the RF receiving means 100 through a connection such as a wire 108, and between three and seven volts, ideally five volts to the logic interface 96. Additionally the non-volatile memory 94 on the receiver 90 may store crash data which can be retrieved for use in accident analysis at a later date. It should be understood that the system may be in communication with any onboard computer or navigation system. An alternate embodiment includes a warning device 98 as depicted in FIG. 1D, connected to the receiver's 90 logic interface 96. This warning device 98 can be an internal or external device selected from the group consisting of audio warning device, visual warning device, vibratory warning device, LED(s), buzzers, or lights with varying tone or flash pattern. This embodiment may vary the speed, brightness, vibratory notification speed or pattern of the warning device 98.

Figure 2A:
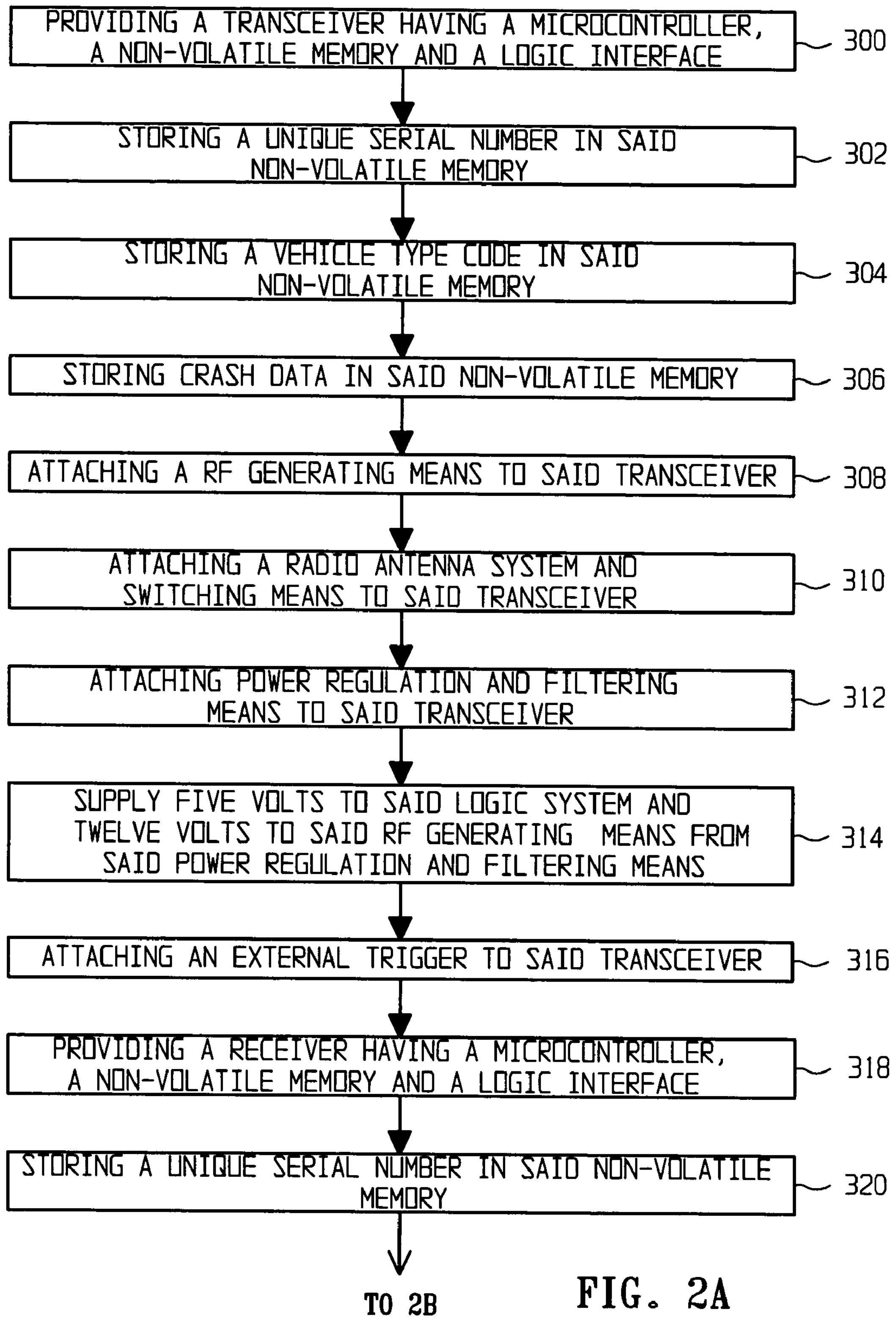
FIGS. 2A, 2B depicts a method of manufacturing a system for notifying drivers of oncoming emergency vehicles according to the present invention.
Figure 2B:
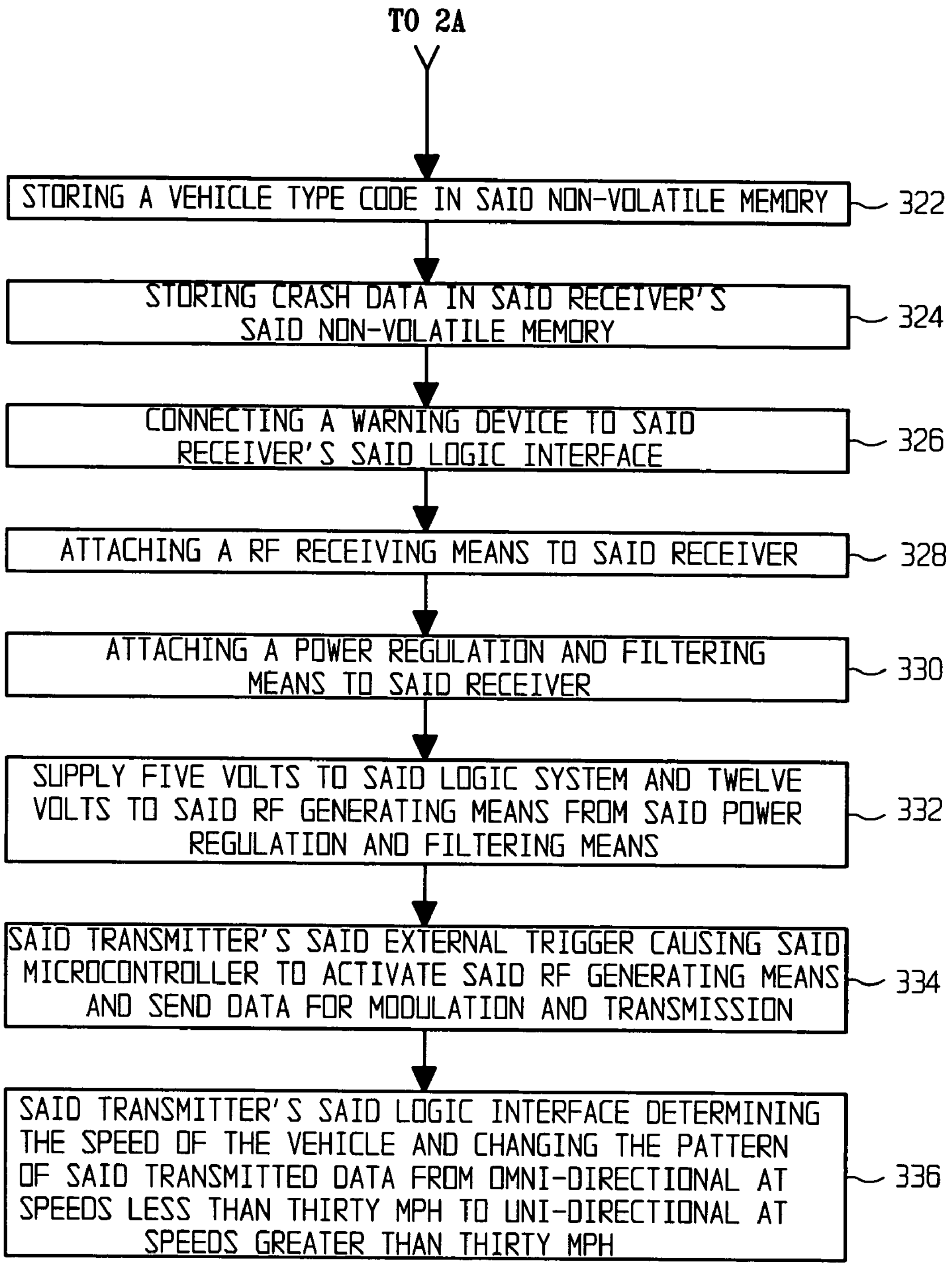

FIG. 2 is a diagram disclosing a method of manufacturing a system for notifying drivers of emergency vehicles, comprising the steps of 300 providing a transmitter 50 having a microcontroller 52, a non-volatile memory 54 and a logic interface 56. The next step 3 02 may be one of storing a unique serial number in the non-volatile memory 54, by way of example, this may be accomplished by assigning the license plate or vehicle identification number so transmitters within different vehicles can be distinguished. This may be followed by 304 storing a vehicle type code in the non-volatile memory 54, by way of example, all ambulances may be assigned a prefix or postfix of 'A' or '2' on the unique serial number, thus designating the vehicle an ambulance. Alternatively a second type code could be assigned designating the vehicle a police vehicle, or ambulance. This may be followed by step 306, storing crash data in the non-volatile memory. This is followed by step 308 attaching a RF generating means to the transmitter 50; this may be accomplished by attaching a wire between the microcontroller 52 and the RF amplifier/generator 60. This is followed by step 310, attaching a radio antenna 62 and element switching means 74 to the transmitter 50. These are connected to the RF amplifier/generator 60. Followed by step 312 attaching power regulation and filtering means 64 to the transmitter 50, this may be accomplished by attaching a power supply 76 to the power regulation and filtering means 64 and through the power regulation and filtering means 64, power is supplied to the various internal elements. This may be followed by step 314 supplying between three and seven volts, ideally approximately five volts to the logic system 56 and between negative fifteen and fifteen volts, ideally approximately twelve volts to the RF amplifier/generator 60, from the power regulation and filtering means 64, which may be accomplished by connecting wires between the power regulation and filtering means and other components. Following this is step 316, attaching an external trigger 72 to the transmitter 50, which may include a connection to an existing light and siren warning system, or the implementation of an external switch to activate the system. Followed by step 318, providing a receiver 90 having a microcontroller 92, a non-volatile memory 94 and a logic interface 96. This may be followed by step 320 storing a unique serial number in the non-volatile memory 54, which may include storing the vehicle's license plate or vehicle identification number so receivers in different vehicles can be distinguished. It should also be understood that the system as in the present invention may be in communication with any on-board computer systems or navigation systems. This may be followed by step 322, storing a vehicle identification code in the non-volatile memory 54, which may be embodied by appending a prefix or postfix to the unique serial number to make a 'S' a sport utility vehicle or '7' as a sport utility vehicle. This may be followed by step 324, storing crash data in the non-volatile memory 54. The next step 326 may be that of connecting a warning device to the logic interface 98. This device may be either an internal or external warning device embodied by a visual, audio or vibratory warning device which changes its type or rate of alert depending on the received signal. This is followed by step 328, attaching a RF receiving means 100 to the receiver 90, this may be accomplished by means of a wire connected to the microcontroller 92. This is followed by step 330, attaching a power regulation and filtering means 102 to the receiver 90, which may include attaching power regulation and filtering means 102 to a power source 112 and connecting using wires or a similar known method within the art to microcontroller 92, logic interface 96, non-volatile memory 94 and RF receiving means 100. This may be followed by step 332 supplying between three and seven volts, ideally approximately five volts to the logic system 96 and between negative fifteen and fifteen volts, ideally approximately twelve volts to the RF generating means 100 from the power regulation and filtering means 102. The following step 334 of the transmitter's external trigger 72 may cause the microcontroller 52 to activate the RF generating means 60 and send data for modulation and transmission; this may be done across wires or a similar means known within the art. Additionally 336 the logic interface 56 may determine the speed of the vehicle using a speed monitor 58 and change the radio energy pattern of transmitted data from omni-directional at speeds less than thirty MPH to unidirectional at speeds greater than thirty MPH.

This detailed description is of the best currently contemplated modes of carrying out the invention. The description is not to be taken in a limiting sense, but is made merely for the purpose of illustrating the general principles of the invention, since the scope of the invention is best defined by the appended claims.

I claim:

1. A system for notifying drivers of emergency vehicles, said system comprising:

a transmitter having a microcontroller, a non-volatile memory, and a logic interface for sending and receiving external signals;

a RF generating means in electrical communication with said transmitter;

a radio antenna system and switching means in electrical communication with said transmitter;

a power regulation and filtering means in electrical communication with said transmitter;

an external trigger in electrical communication with said transmitter;

a receiver having a microcontroller, a non-volatile memory and a logic interface for sending and receiving external signals;

a RF receiving means in electrical communication with said receiver; and a power regulation and filtering means in electrical communication with said receiver.

2. A system as in claim 1, wherein said non-volatile memory stores a unique serial number and vehicle type code.

3. A system as in claim 2, wherein said vehicle type code is selected from the following group consisting of police vehicles, fire department vehicles, emergency medical units, passenger vehicles, motorcycles, sport utility vehicles, trucks, mopeds, or commercial vehicles.

4. A system as in claim 1, wherein said external trigger causes said microcontroller to activate said RF generating means and send data for modulation and transmission.

5. A system as in claim 1, wherein said transmitter's said logic interface determines the speed of said emergency vehicle and said microcontroller provides a command to said RF generating means to change the radio energy pattern of transmitted data from omni-directional at speeds under thirty miles per hour, to uni-directional at a speed greater then thirty miles per hour.

6. A system as in claim 1, wherein said power regulation and filtering means supplies between three and seven volts to said logic system.

7. A system as in claim 1, wherein said power regulation and filtering means supplies negative fifteen and fifteen volts to said RF generating means.

8. A system as in claim 1, wherein said receivers said non-volatile memory stores crash data.

9. A system as in claim 1, further comprising a warning device in communication with receivers said logic interface.

10. A system as in claim 9, wherein said warning device is selected from the group consisting of audio warning device, visual warning device, vibratory warning device, LED(s), buzzers, or lights with varying tone or flash pattern.

11. A system as in claim 9, wherein said warning device varies relative to the speed of the approaching emergency vehicle.

12. A system for notifying drivers of emergency vehicles, said system comprising:

a transmitter having a microcontroller which dictates a change in the radio energy pattern of transmitted data from omni-directional at speeds under thirty MPH to uni-directional at speeds above thirty MPH, a non-volatile memory storing a unique serial number and vehicle type code, and a logic interface for sending and receiving external signals which determines the speed of the vehicle;

a RF generating means in electrical communication with said transmitter;

a radio antenna system and switching means in electrical communication with said transmitter;

a power regulation and filtering means in electrical communication with said transmitter which supplies between three and seven volts to said logic system and between negative fifteen and fifteen volts to said RF generating means;

an external trigger in electrical communication with said transmitter which causes said microcontroller to activate said RF generating means and send data for modulation and transmission;

a receiver having a microcontroller, a non-volatile memory storing a unique serial number and vehicle type code and a logic interface for sending and receiving external signals connected to a warning device wherein said device varies relative to the speed of the approaching emergency vehicle;

a RF receiving means in electrical communication with said receiver; and a power regulation and filtering means in electrical communication with said receiver which supplies between three and seven volts to said logic system and between negative fifteen and fifteen volts to said RF generating means.

13. A system as in claim 12, wherein said vehicle type code is selected from the following group consisting of police vehicles, fire department vehicles, emergency medical units, passenger vehicles, motorcycles, sport utility vehicles, trucks, mopeds, or commercial vehicles.

14. A system as in claim 12, wherein said warning device is selected from the group consisting of audio warning device, visual warning device, vibratory warning device, LED(s), buzzers, or lights with varying tone or flash pattern.

15. A method of manufacturing a system for notifying drivers of emergency vehicles comprising the steps of:

providing a transmitter having a microcontroller, a non-volatile memory and a logic interface;

attaching a RF generating means to said transmitter;

attaching a radio antenna system and switching means to said transmitter;

attaching power regulation and filtering means to said transmitter;

attaching an external trigger to said transmitter;

providing a receiver having a microcontroller, a non-volatile memory and a logic interface;

attaching a RF receiving means to said receiver; and attaching a power regulation and filtering means to said receiver.

16. A method as in claim 15, further comprising the step of storing a unique serial number in said non-volatile memory.

17. A method as in claim 15, further comprising the step of storing a vehicle type code in said non-volatile memory.

18. A method as in claim 15, further comprising the step of said transmitter's said external trigger causing said microcontroller to activate said RF generating means and send data for modulation and transmission.

19. A method as in claim 15, further comprising the step of said transmitter's said logic interface determining the speed of the vehicle and changing the radio energy pattern of said transmitted data from omni-directional at speeds less then thirty MPH to uni-directional at speeds greater then thirty MPH.

20. A method as in claim 15, further comprising the step of supplying between three and seven volts to said logic system.

21. A method as in claim 15, further comprising the step of supplying between negative fifteen and fifteen volts to said RF generating means from said power regulation and filtering means.

22. A method as in claim 15, further comprising the step of storing crash data in said non-volatile memory.

23. A method as in claim 15, further comprising the step of connecting a warning device to said receiver's said logic interface.

* * * * *